(12) United States Patent  (10) Patent No.: US 7,709,731 B2
Larsen  (45) Date of Patent: May 4, 2010

(54) ELECTRIC POWER SUPPLY AND A METHOD OF PRODUCTION THEREOF

(75) Inventor: Helge Larsen, Västerås (SE)

(73) Assignee: ABB Technology Ltd., Zürich (CH)

( * ) Notice: Subject to any disclaimer, the term of this patent is extended or adjusted under 35 U.S.C. 154(b) by 354 days.

(21) Appl. No.: 11/802,031

(22) Filed: May 18, 2007

(65) Prior Publication Data

US 2007/0289766 A1 Dec. 20, 2007

(30) Foreign Application Priority Data

May 18, 2006 (EP) .................................. 06114158

(51) Int. Cl.
*H01B 7/00* (2006.01)
(52) U.S. Cl. ....................................................... 174/24
(58) Field of Classification Search ............. 174/102 R, 174/105 R, 108, 47, 74 R, 77 R; 138/112, 138/113, 114, 121; 166/384, 385
See application file for complete search history.

(56) References Cited

U.S. PATENT DOCUMENTS

| 4,336,415 | A | * | 6/1982 | Walling | 174/47 |
| 4,346,256 | A | * | 8/1982 | Hubbard et al. | 174/47 |
| 4,569,392 | A | * | 2/1986 | Peterman | 166/65.1 |
| 4,830,113 | A | * | 5/1989 | Geyer | 166/369 |
| 5,145,007 | A | * | 9/1992 | Dinkins | 166/386 |
| 5,146,982 | A | * | 9/1992 | Dinkins | 166/65.1 |
| 6,143,988 | A | * | 11/2000 | Neuroth et al. | 174/105 R |
| 6,145,597 | A | * | 11/2000 | Kobylinski | 166/384 |
| 6,298,917 | B1 | * | 10/2001 | Kobylinski et al. | 166/369 |
| 6,479,752 | B1 | * | 11/2002 | Neuroth et al. | 174/106 R |
| 6,761,574 | B1 | * | 7/2004 | Song et al. | 439/320 |

OTHER PUBLICATIONS

Stenius et al; The Challenges of Offshore Power System Construction-Bringing Power Successfully to Troll A, One of the Worlds Largest Oil and Gas Platform; Mar. 31, 2006; pp. 75-78.
Morello et al; Power Transmission By Way of Submarine Cables; 1975; pp. 141-154.

* cited by examiner

*Primary Examiner*—William H Mayo, III
(74) *Attorney, Agent, or Firm*—Venable LLP; Eric J. Franklin

(57) ABSTRACT

A power supply system including an element connected to a remote power supply source or power consumer through an electric power supply device. The element is movably arranged in relation the source or consumer in an environment in which at least a part of the power supply device is subjected to water and water vapor and to repeated bending motion due to the movement of the element. The electric power supply device includes an electric cable that includes a conductor and at least one layer of an electrically insulating material applied on the outside of the conductor. The device includes a member for preventing water and vapor intrusion into the layer. The member includes a flexible, watertight, vapor impermeable, fatigue resistant, separate tubing that surrounds the electric cable.

13 Claims, 2 Drawing Sheets

ELECTRIC POWER SUPPLY AND A METHOD OF PRODUCTION THEREOF

CROSS-REFERENCE TO RELATED APPLICATION

This application claims priority to European patent application number 06114158.6 filed 18 May 2006.

TECHNICAL FIELD

The present invention relates to a power supply system comprising an element connected to a remote power supply source or power consumer through an electric power supply device, said element being movably arranged in relation said source or consumer in an environment in which at least a part of the power supply device is subjected to water and water vapour and to repeated bending motion due to the movement of said element, said electric power supply device comprising an electric cable that comprises a conductor and at least one layer of an electrically insulating material applied on the outside of said conductor, and wherein the device comprises a means for preventing water and vapour intrusion into said layer.

The invention also relates to a method of producing an electric power supply system according to the invention.

The power supply device of the invention may also be referred to as a power transmission line.

Typically, the electric power supply device transmits electric power of medium or high voltage, wherein medium voltage is referred to as from about 1 kV up to about 40 kV, while high voltage is referred to as from about 40 kV up to about 300 kV

BACKGROUND OF THE INVENTION

Off shore vessels such as platforms, for example intended for oil or gas exploitation, ships or buoys often need to be connected to a remote electric energy supply source in order to be supplied with the energy needed for the operation thereof. Alternatively, they may themselves form the energy supply source, and thus be connected to a remote energy consumer. The remote energy supply source or consumer may either be located on shore or off shore.

Oil platforms standing on the sea bottom have been supplied with electric energy through an electric cable extending fixedly from an on shore installation along the bottom to the legs of the oil platform.

However, the electric insulation is sensitive to intrusion of water and water vapour. For the purpose of preventing intrusion of sea water and vapour into an electrical insulation surrounding the electrically conducting part of the cable the cable has been provided with a lead sheath, provided as a layer of lead embedded in or located between one or more layers of a polymer that surrounds the electric insulation. The need of said sheath is, in particular, due the fact that contemporary polymers used for the purpose of preventing intrusion of water and for protecting the core part of HV-cables do not present a sufficient shield against vapour intrusion over time.

A problem arises for those applications by which the vessel is floating on the surface, and hence is moving with the heaving of the sea. Then, at least a part of the electric cable, normally the one extending from the sea bottom region to the top side region, must be let freely move in the sea. In this case the lead sheath on the cable insulation which prevent water and vapour intrusion into the electrical insulation will be subjected to fatigue and will eventually crack as a result thereof and will, accordingly, loose its functionality as a water and vapour intrusion preventing means. The invention aims at solving this problem.

THE OBJECT OF THE INVENTION

The object of the invention is to present a power supply system with an electric power supply device which in a reliable way, with no intrusion of sea water or vapour into the electrical insulation of a cable thereof, is able to transmit electric power in an environment such as open sea in which the electric cable is subjected to repeated bending due to the motion of the sea.

The electric power supply device, at least the part thereof subjected to considerable and repeated bending motion while immersed in the sea, should have a fatigue strength such that the functionality thereof is not negatively effected by said motion. In particular, the means for preventing sea water and vapour intrusion into the electric insulation of the electric cable should be fatigue resistant in order not to crack due to said motion.

SUMMARY OF THE INVENTION

The object of the invention is achieved by means of the initially defined power supply system which is characterised in that said means for preventing water and vapour intrusion comprises a flexible, watertight, vapour impermeable, fatigue resistant, separate tubing that surrounds said electric cable. The tubing is not an integrated part of the electric cable likewise the conductor part and the insulating part of the latter. Instead it forms a separate outer cover or envelope into which at least a relevant part of the cable can be fed or inserted for the purpose of providing the latter with a functional water and vapour intrusion-preventing means. The part of the cable that is surrounded by the tubing may or may not be provided with a lead or metal sheath as has been described above for the prior art. Thanks to the invention, the length of the cable adapted to the prescribed conditions may be tailored for each individual application by means of a corresponding adapting of the length thereof covered and enclosed by said separate tubing.

Preferably, the material of said tubing has a fatigue resistance higher than that of lead, which is the material used as the shield up to this date.

Preferably, the material and design of the tubing is such that, when confronted to a bending of the magnitude corresponding to its application as a flexible riser between a floating vessel and the sea bottom, the material thereof will be subjected to elastic deformation rather than plastic deformation.

It should be understood that the tubing may comprise a plurality of layers of different or similar materials or compositions. However, according to a preferred embodiment of the invention said tubing comprises at least one metal layer.

Preferably said tubing comprises a metal tubing, a so called riser, of a kind that has been successfully used for, for example, the transportation of gas and oil from subsea wells up to top side platforms and is commercially available.

According to one embodiment of the invention there is a spacing between the outer periphery of the electric cable and the inner periphery of said tubing, and in said spacing there is provided a pressure compensation medium. Accordingly, the wall thickness of the tubing does not need to be dimensioned in order to stand the outer pressure that the tubing will be subjected to in a sub-sea application, but may be of less strength and, accordingly, less expensive.

Preferably said pressure compensation medium is a liquid, such as oil. The liquid should either be of a character harmless to the electric insulation or of a character such that it can be prevented from intruding into the electric insulation by means of any polymer layer surrounding said insulation.

According to a further embodiment of the inventive power supply system it comprises a pressurising member connected to said pressure compensation medium. Such a member may comprise a pump, if the pressure medium is a liquid, or a compressor, if the pressure medium is gas. Preferably, said member is arranged on a vessel, from which the tubing extends when being used under operational conditions.

According to one embodiment said element comprises a floating vessel and the electric cable extends submerged in open sea in which it is subjected to sea motion, including a motion of the vessel caused by the heaving sea.

According to a further embodiment of said system a first part of the electric cable is freely movably arranged in open sea and a second part of the electric cable is fixedly arranged in the sea, only the first part of the electric cable being surrounded by said tubing. In other words, the second part of the cable is less subjected to bending and/or twisting than the first part thereof or not subjected thereto at all.

According to a further embodiment the first part of the electric cable extends from a top side installation to a fixed sea bottom installation and that the second part of the electric cable extends from said sea bottom installation and along the sea bottom.

Preferably the second part of the electric cable comprises a integrated metal sheath, preferably a lead sheath, forming a water and vapour intrusion prevention means for the second part of the electric cable.

According to one embodiment the remote power supply source or power consumer is located on shore.

According to another embodiment the remote power supply source or power consumer is located off shore on a second vessel.

Further features and advantages of the present invention will be evident from the following detailed description.

BRIEF DESCRIPTION OF THE DRAWINGS

Hereinafter a preferred embodiment of the invention will be described with reference to the drawing on which.

DETAILED DESCRIPTION OF THE INVENTION

Figure 1:
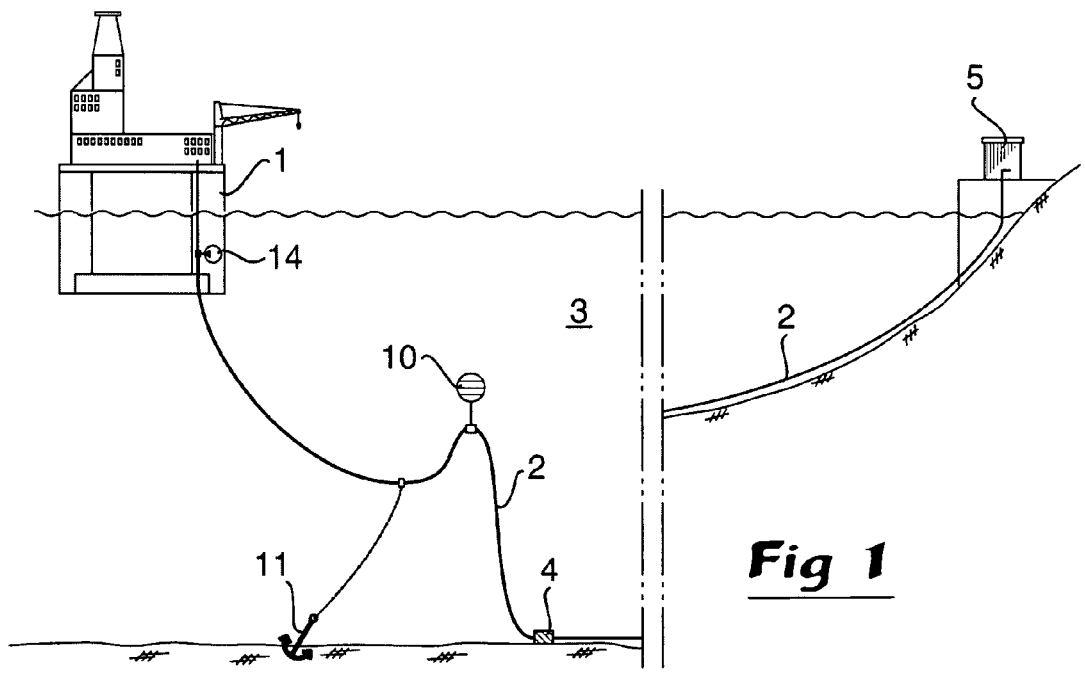
FIG. 1 is a schematic representation of a floating vessel power supply system according to first embodiment of the invention.

FIG. 1 shows a first embodiment of the floating vessel power supply system of the invention. The system comprises a floating vessel 1 an electric power supply device 2 extending freely from the vessel 1 through the sea 3 to a fixed bottom installation 4 and further from said bottom installation 4 to a remote power supply source or power consumer 5.

In this embodiment the floating vessel 1 is a floating off shore installation from which oil or gas is exploited from a subsea oil or gas field. It should be understood that such an installation includes all elements needed for such exploitation, and that, for reasons of clarity, no such elements apart from the inventive power supply device 2 are shown in the figures.

Figure 3:
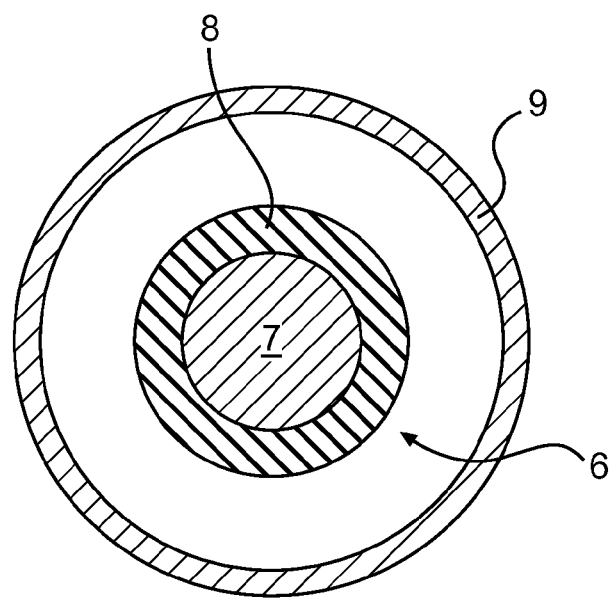
FIG. 3 is a cross-section of a first part of an electric power supply device according to the invention, and FIG. 4. is a cross-section of a second part of an electric power supply device according to the invention.
Figure 4:
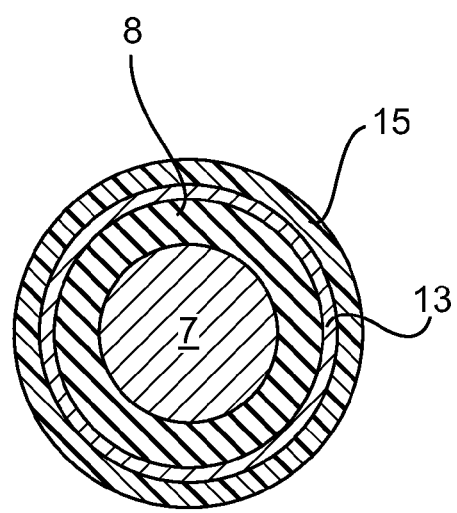

The electric power supply device mainly comprises an electric cable 6. As can be seen in FIGS. 3 and 4, the cable 6 comprises an electric conductor 7 forming the core of the cable 6, and an electric insulation 8, preferably a polymer, applied to the outer periphery of the conductor 7. The electric insulation 8 is sensitive to water and water vapour. Further layers of polymer and/or armouring that may be integrated in the cable have, for the sake of clarity, not been shown in the drawing. However, it should be understood that such components may be provided.

In the embodiment shown in FIG. 3, along a first part of the power supply device 2 there is also provided a separate tubing or envelope 9 that surrounds the cable 6. The tubing 9 may be a spiral wound metal tubing or a corrugated tubing. This kind of tubing may also be used for the purpose of taking oil or gas from the subsea reservoir to the topside vessel 1. The tubing 9 is water and vapour impermeable, flexible and has a fatigue strength that enables it to be subjected to repeated bending motions in the sea without cracking and thereby loosing its water and vapour impermeability. Thereby, provided that there is arranged a sealing at the submerged end of the tubing 9, the tubing 9 forms a watertight and vapour-impermeable sheath around the cable 6 that prevents the sea water and vapour from getting into direct contact with the insulation 8, which is sensitive to such contact.

In FIG. 1, the first part of the electric cable 6 provided with the tubing 9 extends from a fixed upper end of the cable 6 to the fixed bottom installation 4. The upper end of the cable 6 may be connected to any suitable equipment on the vessel 1. The bottom installation 4 may be a connection box, which, preferably, is water tight and which forms a sealing at the end of the tubing 9. The first part of the cable 6 has an excessive length, i.e. longer than the shortest distance between the upper end thereof and the fixed bottom installation 4, in order to adopt the motions of the sea and the movements of the vessel 1 without being strained. In the embodiment of FIG. 1, there is provided a buoy 10 that is connected to the first part of the cable and that prevents the first part of the cable 6 from dragging on the sea bottom. There is also provided an anchoring member 11 that cooperates with the buoy 10 in keeping the first part of the cable 6 in a suitable suspended position in the mass of sea water.

Figure 2:
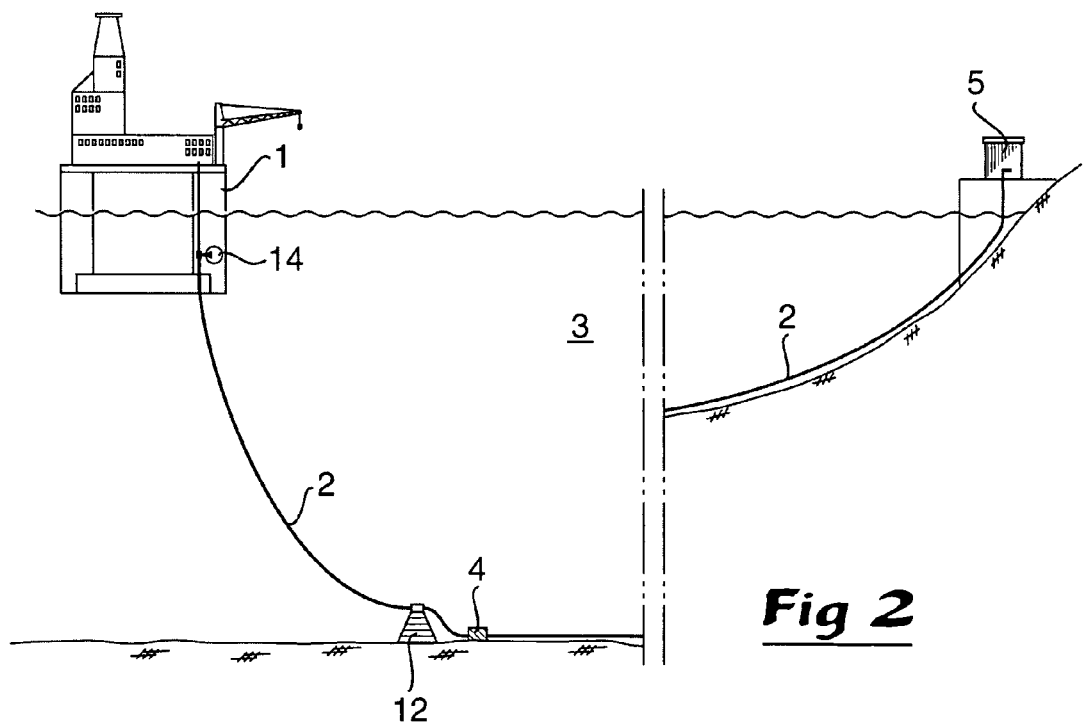
FIG. 2 is a schematic representation of a floating vessel power supply system according to a second embodiment of the invention.

FIG. 2 shows an alternative embodiment in which the buoy and the anchoring member have been replaced by a tower 12 on the sea bottom. The tower 12 acts as a guiding member to which the cable 6, or more precisely the tubing 9, is connected.

A second part of the electric cable 6 extends from the fixed bottom installation 4 along the bottom and further to the remote power supply source or power consumer 5. Preferably, the second part of the cable 6 is relatively immovable. It may even be secured to the bottom at predetermined intervals or be dug into the bottom. As can be seen in FIG. 4, which shows a cross section of the second part of the cable 6, the second part of the cable is not surrounded by any tubing like the one surrounding the first part. Instead the means for preventing intrusion of sea water into the conductor 7 is formed by a metal sheath 13, preferably a lead-based sheath, provided as a layer on the outside of the insulation 8. Since the second part of the cable 6 is less subjected to bending than the first part thereof, the sheath 13 need not have a fatigue strength with regard to bending and twisting as good as the one of the tubing 9. A layer 15 of a polymer surrounds and encloses the sheath 13. Further layers of polymer may be provided.

Further, as the inventive power supply device is positioned in deep sea water, the tubing 9 will be subjected to a relatively high outer pressure. Since there is a play, and hence a spacing, between the outer periphery of the cable 6 and the inner periphery of the tubing 9, the wall of the tubing 9 will be subjected to important pressure forces unless a compensation pressure is applied inside the tubing 9. Preferably, said spacing, or at least a sealed off section thereof, for example the bottom section, is filled with a pressure compensation medium, preferably a liquid to which the electric insulation is insensitive or can be isolated by means of a polymer layer. In the embodiments of FIGS. 1 and 2 a pressurising member 14, such as a pump, located on the vessel 1 is connected to said pressure compensation medium. As an alternative to applying a compensation pressure, the wall of the tubing 9 may be dimensioned such that it will be able to stand said outer pressure by itself.

The embodiments of FIGS. 1 and 2 both show the inventive power supply device connected with a vessel 1 and a power source or power consumer 5 on shore. However, it should be understood that the power source or consumer 5 as well might be located on another vessel, which, in its turn, may be freely floating or standing on the bottom.

It should be realised that the above description has been by way of example and that, for a person skilled in the art, a plurality of embodiments will be obvious without going beyond the scope of the invention as defined by the appended claims supported by the description and the drawings.

For example, it is to be understood that the cable according to the invention comprises at least one conductor and may comprise a plurality of conductors, embedded in the described electrical insulation layer or layers, for the purpose of conducting a plural phase electric power. In other words, the one conductor 7 described above may as well be subdivided in a plurality of conductors. There may also be provided more than one cable surrounded by the tubing.

The invention claimed is:

1. A power supply system, comprising:
   an electric power supply device comprising
      an electric cable comprising a conductor at least one layer of electrically insulating material surrounding the conductor; and
      an envelop element comprising a flexible, watertight, vapor impermeable, fatigue resistant tubing surrounding and separate from the electric cable, the element not being integrated with the electric cable and preventing water and water vapor intrusion into the at least one layer of electrically insulating material,
   wherein the electric power supply device extends between an element and a remote power supply source or power consumer, the element being movably arranged in relation the power supply source or consumer in an environment in which at least a part of the power supply device is subjected to water and water vapor and to repeated bending motion due to the movement of the element.

2. The electric power supply system according to claim 1, wherein the tubing comprises at least one metal layer.

3. The electric power supply system according to claim 1, further comprising:
   a spacing between the outer periphery of the electric cable and the inner periphery of the tubing, and
   a pressure compensation medium arranged in the spacing.

4. The electric power supply device according to claim 3, wherein the pressure compensation medium is a liquid.

5. The electric power supply system according to claim 3, further comprising:
   a pressurizing member connected to the pressure compensation medium to pressurize the pressure compensation medium within the spacing.

6. The power supply system according to claim 1, wherein the element comprises a floating vessel, and wherein the electric cable of the power supply device extends submerged in open sea in which the power supply device is subjected to sea motion.

7. The power supply system according to claim 6, wherein a first part of the electric cable is freely movably arranged in open sea, and wherein a second part of the electric cable is fixedly arranged in the sea, and wherein only the first part of the electric cable is surrounded by the tubing.

8. The power supply system according to claim 7, wherein the first part of the electric cable extends from a top side installation to a fixed sea bottom installation, and wherein the second part of the electric cable extends from the sea bottom installation and along the sea bottom.

9. The power supply system according to claim 7, wherein the second part of the electric cable comprises an integrated metal sheath to prevent a water and water vapor from penetrating the second part of the electric cable.

10. The power supply system according to claim 1, wherein the remote power supply source or power consumer is located on shore.

11. The power supply system according to claim 1, wherein the remote power supply source or power consumer is located off shore on a second vessel.

12. A method of producing a power supply system, the method comprising:
   feeding an electric cable comprising a conductor at least one layer of electrically insulating material surrounding the conductor into an envelop element comprising a flexible, watertight, vapor impermeable, fatigue resistant tubing surrounding and separate from the electric cable, the element not being integrated with the electric cable and preventing water and water vapor intrusion into the at least one layer of electrically insulating material.

13. A power supply system, comprising:
   a floating vessel;
   a remote power supply source or power consumer; and
   an electric power supply device extending between the floating vessel and the remote power supply source or power consumer through open water, wherein the element is movably arranged in relation the power supply source or consumer in an environment in which at least a part of the power supply device is subjected to water and water vapor and to repeated bending motion due to the movement of the element, the electric power supply device comprising
      an electric cable comprising a conductor at least one layer of electrically insulating material surrounding the conductor; and
      an envelop element comprising a flexible, watertight, vapor impermeable, fatigue resistant tubing surrounding and separate from the electric cable, the element not being integrated with the electric cable and preventing water and water vapor intrusion into the at least one layer of electrically insulating material.

* * * * *